United States Patent
Roger et al.

(10) Patent No.: US 11,099,256 B2
(45) Date of Patent: Aug. 24, 2021

(54) DEVICE AND METHOD FOR PROCESSING RADAR SIGNALS

(71) Applicant: Infineon Technologies AG, Neubiberg (DE)

(72) Inventors: Andre Roger, Munich (DE); Christian Schmid, Linz (AT); Romain Ygnace, Munich (DE)

(73) Assignee: Infineon Technologies AG, Neubiberg (DE)

( * ) Notice: Subject to any disclaimer, the term of this patent is extended or adjusted under 35 U.S.C. 154(b) by 276 days.

(21) Appl. No.: 16/000,979

(22) Filed: Jun. 6, 2018

(65) Prior Publication Data

US 2018/0356497 A1 Dec. 13, 2018

(30) Foreign Application Priority Data

Jun. 13, 2017 (DE) .......................... 102017113022.5

(51) Int. Cl.
| | |
|---|---|
| *G01S 7/295* | (2006.01) |
| *G01S 7/03* | (2006.01) |
| *G01S 7/28* | (2006.01) |
| *G06F 13/30* | (2006.01) |

(52) U.S. Cl.
CPC ................ *G01S 7/295* (2013.01); *G01S 7/03* (2013.01); *G01S 7/2806* (2013.01); *G06F 13/30* (2013.01)

(58) Field of Classification Search
CPC .......... G01S 7/295; G01S 7/03; G01S 7/2806; G06F 13/30

USPC .......................................................... 342/190
See application file for complete search history.

(56) References Cited

U.S. PATENT DOCUMENTS

| | | | |
|---|---|---|---|
| 6,226,321 B1* | 5/2001 | Michels .................. | G01S 7/292 375/227 |
| 2012/0105268 A1* | 5/2012 | Smits ...................... | G01S 7/025 342/22 |
| 2014/0375491 A1* | 12/2014 | Roger .................... | G01S 7/2922 342/93 |
| 2016/0131744 A1* | 5/2016 | Addison ............... | G01S 13/931 342/196 |
| 2016/0282458 A1* | 9/2016 | Nugraha ............... | G01S 13/343 |
| 2020/0341109 A1* | 10/2020 | Meissner ................ | G01S 7/417 |

FOREIGN PATENT DOCUMENTS

| | | |
|---|---|---|
| DE | 102014009201 A1 | 12/2014 |
| DE | 102014116452 A1 | 5/2016 |
| DE | 102015104776 A1 | 9/2016 |

OTHER PUBLICATIONS

Machine Translation of a portion of German office action in DE102017113022, dated Apr. 9, 2018 (Year: 2018).*
German Patent Office, Office Action issued for DE 102017113022. 5, 10 pgs., dated Apr. 9, 2018.

* cited by examiner

*Primary Examiner* — Frank J McGue
(74) *Attorney, Agent, or Firm* — Schiff Hardin LLP

(57) ABSTRACT

A device for processing radar signals is suggested, the device comprising: (i) a memory, which is arranged to store radar data and (ii) an accessor comprising a DMA engine, wherein the accessor is arranged to access data of the memory via the DMA engine, to filter the accessed data, and to forward the filtered data.

15 Claims, 2 Drawing Sheets

DEVICE AND METHOD FOR PROCESSING RADAR SIGNALS

BACKGROUND

Embodiments of the present disclosure relate to radar applications, in particular an efficient way to process radar signals obtained by at least one radar sensor, e.g., via at least one antenna. Processing radar signals in this regard in particular refers to radar signals received by a sensor or an antenna.

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, i.e. a signal distributed across the frequency. The amplitude of the signal may indicate an amount of echo, wherein a peak may represent a target that needs to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is in particular known as a threshold method for FFT result analysis which may be based on a signal power. CFAR allows adapting a threshold to decide whether the FFT signal indicates a potential target. CFAR in particular considers background noise, clutter and interference. Several CFAR algorithms are known. For details, reference is made to http://en.wikipedia.org/wiki/Constant_false_alarm_rate.

CFAR may be used as one approach to select FFT peaks, e.g., by comparing such peaks with predefined thresholds.

SUMMARY

A first embodiment relates to a device for processing radar signals comprising
  a memory, which is arranged to store radar data,
  an access unit comprising a DMA engine, wherein the access unit is arranged
    to access data of the memory via the DMA engine,
    to filter the accessed data,
    to forward the filtered data.
A second embodiment relates to a system comprising at least one device according to claim 1 and a central processing component, wherein the central processing component is arranged to conduct a predefined operation based on the filtered radar data supplied by the at least one device.

A third embodiment relates to a method for processing radar signals, the method comprising the steps:
  accessing data of a memory via a DMA engine, which is part of an access unit,
  filtering the accessed data by the access unit,
  forwarding the filtered data from the access unit towards an external unit.

A fourth embodiment is directed to a device for processing radar signals comprising:
  means for accessing data of a memory via a DMA engine, which is part of an access unit,
  means for filtering the accessed data by the access unit,
  means for forwarding the filtered data from the access unit towards an external unit.

A fifth embodiment relates to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

A "bin" may in particular refer to at least one sample, a frequency or a frequency rage (e.g., a ramp of frequencies) that could be associated with a potential target (i.e. at least one potential target). The bin may comprise at least one FFT result (which may be identified by the CFAR algorithm), it may in particular refer to or be based on at least one FFT result.

The bin may in particular represent a sample, an FFT result (of, e.g., a first, second or third stage FFT), a signal power (e.g., the power of an FFT result after coherent or non-coherent integration).

Figure 1:
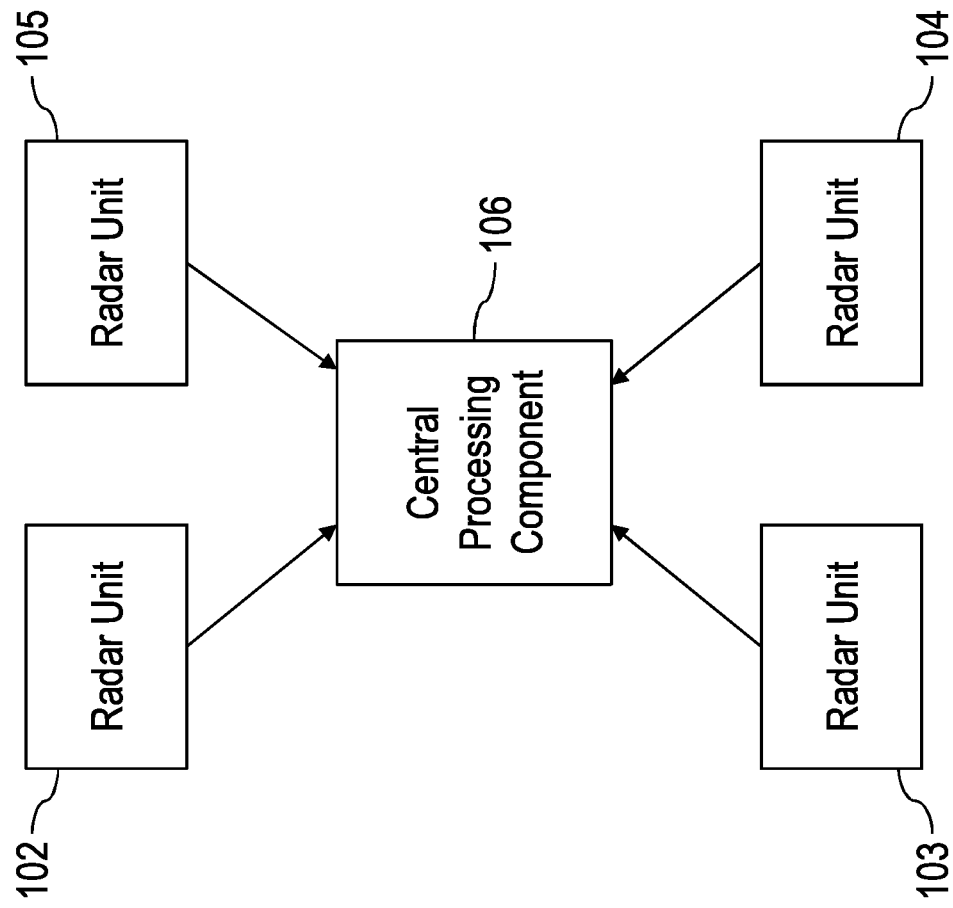
FIG. 1 shows an architectural overview of a radar processing system.

FIG. 1 shows an architectural overview of a radar processing system. A radar unit 102, 103, 104 and 105 each comprises a radar transceiver (emitter and receiver) that is able to emit and detect reflected radar signals. Each such radar unit 102 to 105 comprises a local pre-processing capability and supplies pre-processed radar data to a central processing component 106, which may be able to further process the radar data, e.g., to determine objects within its range.

Each of the radar units 102 to 105 may be realized as having an MMIC unit (MMIC: monolithic microwave integrated circuit) with or without an integrated processing capability (e.g., an integrated pre-processor). Each radar unit 102 to 105 may hence more or less autonomously pre-process radar data and convey pre-processed radar data to the central processing component 106. Also, raw (not pre-processed) radar data may be conveyed directly to the central processing component 106.

Instead of extracting compressed radar data in a straight forward way for basic memory organizations (i.e. one BIN per memory location), the wide application of data buses striving for an optimized memory bandwidth in combination with the use of compressed representations like floating point or pseudo floating point, each physical memory location may contain multiple data words. This makes the filtering for individual words (or data portions in general) quite complex.

Hence, examples described herein suggest an efficient approach to extract relevant data portions, which may in particular be sent to the central processing component 106.

A radar data cube provides an intuitive way to represent radar processing as a function of space and time. The radar data cube may be perceived as a three-dimensional block with the radar returns of a single pulse represented along a first axis, returns from additional receiver elements along a second axis, and a collection of the returns from multiple pulses along a third axis (see, e.g., https://de.math-works.com/company/newsletters/articles/building-and-processing-a-radar-data-cube.html).

The radar data cube comprises data stored in linearly arranged memory locations. The problem, however, is how to extract relevant data in a time and energy efficient way from the data cube which are subject to further processing, e.g., to be conveyed towards the central processing component 106.

Figure 2:
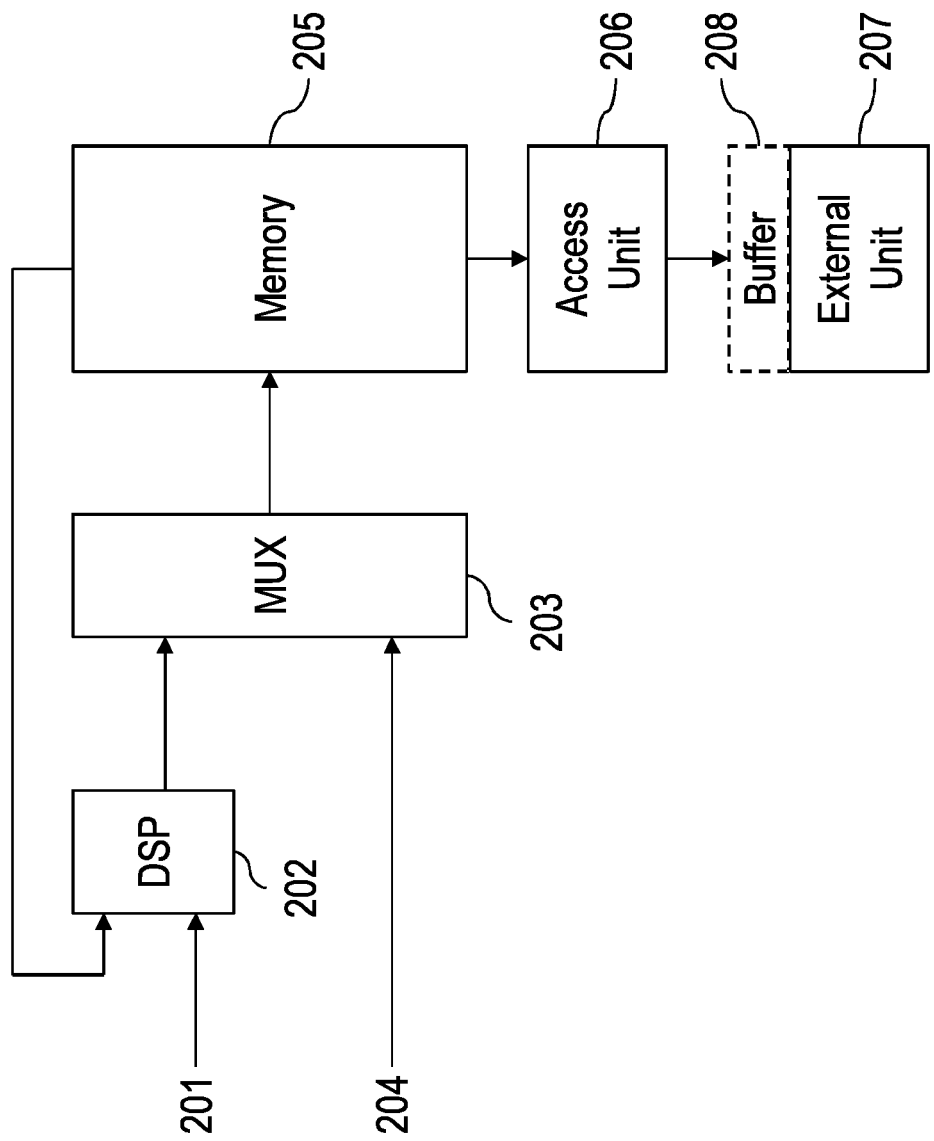
FIG. 2 shows an exemplary arrangement that provides radar signal pre-processing.

FIG. 2 shows an exemplary arrangement that provides radar signal pre-processing. Such pre-processing may be part of any of the radar units 102 to 105.

Raw radar data that has been converted to digital signals 201 is conveyed to a digital signal processor (DSP) 202. The DSP 202 may also be referred to as signaling processor unit (SPU).

The output of the DSP 202 is connected to a multiplexer 203. Also, raw radar data or preprocessed radar 204 data from an external device is conveyed to the multiplexer 203.

The output of the multiplexer 203 is connected to a memory 205. The memory 205 may be a random access memory (RAM) that may in particular store the above mentioned radar data cube. The DSP 202 may also access the memory 205 for further processing (e.g., conducting further FFT processing).

An access unit 206 accesses the memory 205. The access unit 206 may comprise a bin rejection unit that utilizes a direct memory access (DMA) to access the memory 205. The access unit 206 may convey data filtered from the memory 205 and supply such filtered data to(wards) an external unit 207.

It is an option that the access unit 206 is configured by the DSP 202.

In an example, the external unit 207 may be an external control unit (ECU) of, e.g., a vehicle. It is also an option that the external unit 207 is a communication unit that conveys data to, e.g., another ECU. The external unit 207 may in particular supply filtered data.

It is noted that the access unit 206 may perform at least one FFT on the data obtained from the memory 205. It is also an option that the access unit 206 performs a threshold comparison based on the data obtained from the memory 205 and computes a mask based on the results from the threshold comparison. This mask may be used for further processing at the access unit 206 and/or it may be conveyed towards the external unit 207 (see below).

The access unit 206 is able to parse at least a portion of the data stored in the memory 205, in particular (at least a portion of) the radar data cube. The access unit 206 comprises a rejection functionality that comprises at least one condition (or criterion) that may be defined locally or externally. The at least one condition is used to optimize the data transfer from the memory 205 to the external unit 207.

Hence, the access unit 206 may use
  direct memory access (DMA) and
  a mask that defines which bins to be conveyed to the external unit 207, wherein the bin selection may be subject to a condition, e.g.,
  a range and/or
  a Doppler direction.

The mask may be part of the access unit 206 and/or part of the DMA. The mask defines which bins to keep (i.e. to forward to the external unit 207) and which bins to reject (i.e. not to forward to the external unit 207).

It is noted that such mask may optionally be forwarded by the external unit 207 to another unit, e.g., an ECU for further processing purposes.

The mask may hence implement at least one condition.

The mask may be updated after each read access towards the memory 205. Also, the mask may be updated after a predefined amount of read accesses towards the memory 205.

As an option, the access unit 206 may use the DMA to read data from the memory 205 and write it into a buffer 208 that is shared with the external unit 207 ("shared buffer"). A ping-pong buffer mechanism can be used to "fill" the buffer 208 by the access unit 206 and to "empty" the buffer 208 by the external unit 207.

The buffer 208 is optional, i.e. it may be provided or it may be omitted. If the buffer 208 is used, it may be part of the external unit 207 or it may be an entity separate to the external unit 207. It is also an option that the buffer 208 is part of the access unit 206.

The external unit 207 may take (read) the bins from the buffer 208 to forward them to the central processing component 106 shown in FIG. 1. For this purpose the external unit may (be or) comprise an interface to such central processing component 106. One example is a communication interface that can be used to connect the external unit 207 with the central processing component 106.

It is an option that the access unit 206 may pad the buffer 208 with predetermined values (e.g., "0" values) to ensure that the same packet sizes are supplied towards the external unit 207. For example, if the data to be written to the buffer 208 merely has 6 bit and the buffer size is 64 bit, the remaining 58 bit may be padded with "0" values.

It is also an option that the mask may comprise 1 bit per bin, wherein said bit indicates whether the bin is filtered out (rejected) or forwarded to the external unit 207. Also, an additional information may be provided for each bin, e.g., x, y and z, wherein z can represent an angle. If no angle is used, the z coordinate might be omitted.

It is another option that the mask itself (i.e. the binary values representing the filter whether or not to forward the bins towards the external unit 207) is forwarded to the external unit 207. In such case, the central processing component 106 that may eventually obtain this mask information may assess how many bins are (will be) sent and it can check whether the correct amount of bins arrived. This increases the safety of the overall system.

It is a further option that the access unit 206 may utilize an error detection and/or error correction code to further increase the safety of this application. For example, a CRC could be used
  as an error detection code on the addresses of the bins that are to be forwarded and/or as an error detection code on the values of these bins.

It is yet another option that a data format conversion is conducted when passing data from the access unit 206 towards the external unit 207. This is in particular of advantage if the MMIC uses a specific and optimized data format.

The solution presented may be combined with wide data buses thereby utilizing memories with a reduced power consumption.

This approach further allows for a pre-processing that enables extracting relevant regions of data from the radar data cube and passing them to a central unit (e.g. the central processing component 106 shown in FIG. 1), which is part of the central processing or which may be part of a core processing capability. This allows conveying radar information from various spots of a distributed environment, e.g., sensors within a car, and compile pieces of information to a larger context, e.g., a detailed assessment of the surroundings of the car considering its moving speed, direction, objects in front, behind and on the sides of the car. Various applications may thus use the data compiled, wherein such applications may advantageously utilize the central processing capability.

Hence, the solution presented allows accessing bins from the radar data cube in a predefined (e.g., sorted or filtered) way. This is preferably done by reading the entire radar data cube (or a portion thereof) and by parsing the bins according to predefined conditions. The parsing allows determining which bins are forwarded to the external unit 207 and which are not.

The improved data processing introduced by this approach is cost efficient and consumes a reduced amount of power.

The mask may in particular comprise multiple selection conditions that are applied on the data of the radar data cube.

The examples suggested herein may in particular be based on at least one of the following solutions. In particular combinations of the following features could be utilized in order to reach a desired result. The features of the method could be combined with any feature(s) of the device, apparatus or system or vice versa.

A device is suggested for processing radar signals comprising
    a memory, which is arranged to store radar data,
    an access unit comprising a DMA engine, wherein the access unit is arranged
        to access data of the memory via the DMA engine,
        to filter the accessed data,
        to forward the filtered data.

It is noted that processing radar signals also comprises preprocessing at least a portion of (or all) radar signals.

In an embodiment, the radar data are stored in the memory as a radar data cube.

In an embodiment, each radar data comprises a bin, which may be selected or rejected by the filtering of the access unit.

In an embodiment, the access unit is arranged to conduct error detection and/or error correction directed to addresses of the filtered data and/or values of the filtered data.

It is noted that the access unit may be configured (e.g., externally) by receiving a threshold value based on which the access unit then computes internally a selection mask. The selection mask may also be sent by the access unit to the external unit (in addition to the filtered data).

It may also be an option that the access unit is configured by receiving a selection mask, which (as another option) may be conveyed to the external unit (in addition to the filtered data).

In an embodiment, the filter is or corresponds to a mask that comprises information whether data accessed via the DMA engine is forwarded or not.

In an embodiment, a representation of the mask is forwarded.

In an embodiment, the mask is updated after at least one read access to the memory.

In an embodiment, the filtered data is forwarded to an external unit.

The filtered data may be directly or indirectly forwarded to the external unit. The external unit may be located inside a radar sensor or outside of the radar sensor. The external unit may in particular be an ECU (Electronic Control Unit) of, e.g., a vehicle.

In an embodiment, the external unit is a centralized unit.

In an embodiment, the filtered data is forwarded to an external unit via a buffer.

In an embodiment, the buffer is part of the device or part of an external unit.

The buffer may in particular be part of the access unit. The external unit may in particular be an external communication unit.

In an embodiment, the external unit is a central processing component or wherein the external unit is connectable to the central processing component.

The external unit may be connected to an onboard and/or off-board processing component.

In an embodiment, writing the buffer includes padding the buffer with at least one predefined value.

In an embodiment, the device comprises a radar transceiver for emitting radar signals and for sampling reflected radar signals and writing the sampled radar signals into the memory.

Also, a system is provided comprising at least one device as described herein and a central processing component, wherein the central processing component is arranged to conduct a predefined operation based on the filtered radar data supplied by the at least one device.

In addition, a method is suggested for processing radar signals, the method comprising the steps:
    accessing data of a memory via a DMA engine, which is part of an access unit,
    filtering the accessed data by the access unit,
    forwarding the filtered data from the access unit towards an external unit.

Furthermore, a device is provided for processing radar signals comprising:
    means for accessing data of a memory via a DMA engine, which is part of an access unit,
    means for filtering the accessed data by the access unit,
    means for forwarding the filtered data from the access unit towards an external unit.

Also, a computer program product is suggested, which directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for accessing radar data, comprising:
   a memory, which is arranged to store the radar data as a radar data cube, wherein the radar data was received by a receiver via a transmitted signal; and
   an accessor comprising a DMA engine, wherein the accessor is arranged:
   to read access the radar data stored in the memory via the DMA engine,
   to filter, by a filter, the accessed radar data in accordance with a predefined condition which is based on a range or a Doppler direction, wherein the filter is or corresponds to a mask that comprises information whether radar data accessed via the DMA engine is forwarded or not, and
   to forward the filtered radar data,
   wherein a representation of the mask is forwarded.

2. The device according to claim 1, wherein each radar data comprises a bin, which may be selected or rejected by the filtering of the accessor.

3. The device according to claim 1, wherein the accessor is arranged to conduct error detection and/or error correction directed to addresses of the filtered radar data or values of the filtered radar data.

4. The device according to claim 1, wherein the mask is updated after at least one read access to the memory.

5. The device according to claim 1, wherein filtered radar data is forwarded to an external apparatus.

6. The device according to claim 5, wherein the external unit is a centralized apparatus.

7. The device according to claim 1, wherein filtered radar data is forwarded to an external apparatus via a buffer.

8. The device according to claim 7, wherein the buffer is part of the device or part of an external apparatus.

9. The device according to claim 8, wherein the external apparatus is a central processing component or wherein the external apparatus is connectable to the central processing component.

10. The device according to claim 7, wherein writing the buffer includes padding the buffer with at least one predefined value.

11. The device according to claim 1, further comprising:
    a radar transceiver configured to emit radar signals and to sample reflected radar signals and write the sampled radar signals into the memory.

12. A system comprising at least one device according to claim 1 and a central processing component, wherein the central processing component is arranged to conduct a predefined operation based on the filtered radar data supplied by the at least one device.

13. A method for accessing radar data of a radar data cube, the method comprising:
- reading the radar data of the radar data cube from a memory via a DMA engine, which is part of an accessor, wherein the radar data was received by a receiver via a transmitted signal;
- filtering, by a filter, the accessed radar data by the accessor in accordance with a predefined condition which is based on a range or a Doppler direction, wherein the filter is or corresponds to a mask that comprises information whether radar data accessed via the DMA engine is forwarded or not; and
- forwarding the filtered radar data from the accessor towards an external apparatus, and forwarding a representation of the mask.

14. A device for accessing radar data of a radar data cube, comprising:
- accessing means for reading the radar data of the radar data cube from a memory via a DMA engine, which is part of an accessor, wherein the radar data was received by a receiver via a transmitted signal;
- filtering means for filtering the accessed radar data by the accessor in accordance with a predefined condition which is based on a range or a Doppler direction, wherein the filtering means is or corresponds to a mask that comprises information whether radar data accessed via the DMA engine is forwarded or not; and
- forwarding means for forwarding the filtered radar data from the accessor towards an external apparatus, and forwarding a representation of the mask.

15. A non-transitory computer program product directly loadable into a memory of a digital processor, and comprising software code portions which cause a device for accessing radar data of a radar data cube to:
- read the radar data of the radar data cube from a memory via a DMA engine, which is part of an accessor, wherein the radar data was received by a receiver via a transmitted signal;
- filter, by a filter, the accessed radar data by the accessor in accordance with a predefined condition which is based on a range or a Doppler direction, wherein the filter is or corresponds to a mask that comprises information whether radar data accessed via the DMA engine is forwarded or not; and
- forward the filtered radar data from the accessor towards an external apparatus, and forward a representation of the mask.

* * * * *